Dec. 1, 1931.  C. H. CURRIE  1,834,603
SEWER PIPE
Filed Aug. 2, 1929
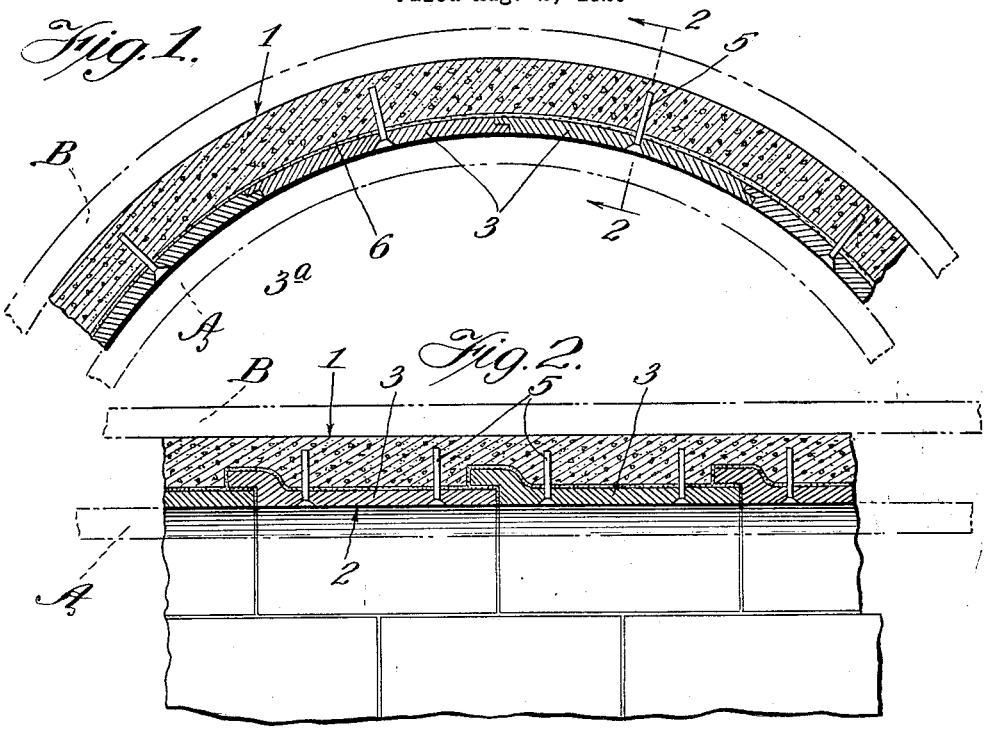
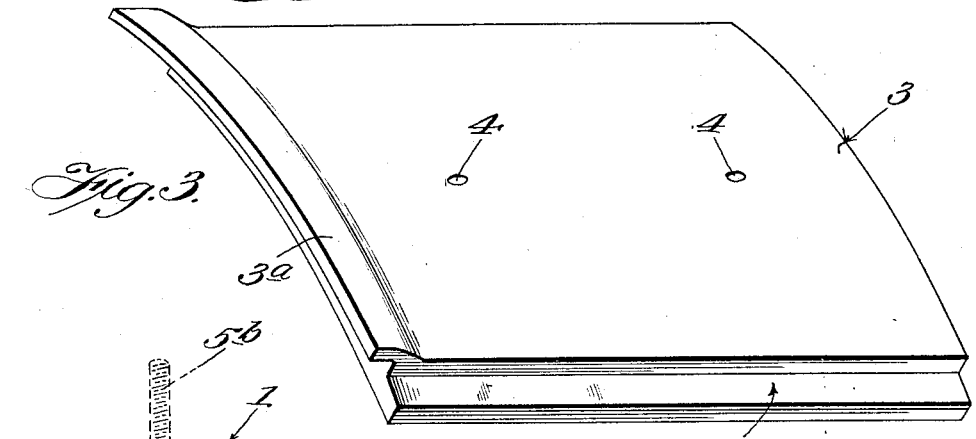
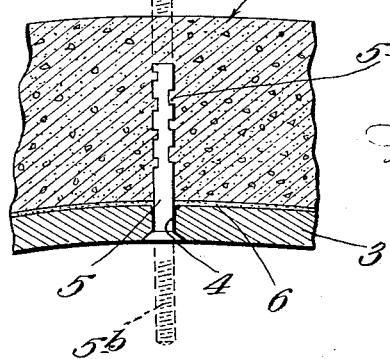
Inventor:
Clare H. Currie.

Patented Dec. 1, 1931

1,834,603

UNITED STATES PATENT OFFICE

CLARE H. CURRIE, OF WEBSTER CITY, IOWA, ASSIGNOR, BY MESNE ASSIGNMENTS, TO L. E. ARMSTRONG REALTY & INVESTMENT CO., OF FORT DODGE, IOWA, A CORPORATION OF IOWA

SEWER PIPE

Application filed August 2, 1929. Serial No. 383,005.

This invention relates to improvements in sewer pipe, and more particularly to pipe or pipe lines used in large sewage handling and disposal systems and method of constructing the same.

By alluding to pipe for sewage systems of large capacity, a distinction is made between the pre-cast vitrified clay pipe used for laying small sewage pipe lines and those of large dimensions which are usually made continuous and of concrete moulded in forms erected in the trench or excavation.

For sewage conveying, however, it is essential to protect or cover the surface of concrete pipe lines from the destructive and corrosive action of the acid constituents of the sewage being handled, and therefore it is common practice to line the inner surface of concrete pipe with a non-corrosive material, such as vitrified clay.

In the present disclosure this lining has the form of thin segmental plates called "liners", and the purpose of the invention is to provide an improved method for anchoring the liners to the surrounding concrete body of the pipe, and further to provide a method of construction for pipe lines which will insure the sealing of the inner lining to the passage of gases to the concrete and otherwise lend itself to the erection of continuous poured concrete pipe lines as distinguished from pre-cast pipe sections, although the latter is also contemplated.

A preferred embodiment of my invention is disclosed in the accompanying drawings, in which Figure 1 is a view in cross section of a sewer pipe constructed in accordance with my invention;

Figure 2 is a view in longitudinal section through the pipe as taken on line 2—2 of Figure 1;

Figure 3 is a perspective view of a single liner, and

Figure 4 is an enlarged detail view in cross section of the pipe at one of the lugs, showing the several forms that may be used.

As clearly shown in Figure 1, the pipe is cylindric in shape and of the required diameter and thickness, and consisting of an outer layer or shell 1 of concrete and an inner layer or lining of vitrified clay 2, made up of a multitude of pre-cast segments or curvilinear plates 3 joined with each other by lap joints at their four edges. The concrete outer shell is considerably thicker than the inner lining, in fact, the thickness of the lining is not a vital factor as its function is primarily that of a protective coating for the inside of the pipe.

Each liner or segmental plate is rectangular in shape, either square or elongated in one direction, as desired, but curved on an arc of a circle corresponding to the internal diameter of the pipe. As shown in Figure 3, each liner is slightly longer in the direction of the pipe, and at one end (left) there is an offset flange or lip 3a similar to the bell-shaped flange at the end of the ordinary pre-cast sewer pipe. The opposite end of the liner is plain, a joint or overlap being made with the forward end of an adjacent plate having the same lip 3a, the lap occurring on the outside of the pipe so that the inner surface is perfectly smooth.

The side edges of each plate are cast to provide square shoulders 3b, 3b of a depth one-half the thickness of the liner and a width about twice the thickness. These shoulders, however, face in opposite directions, one outwardly and the other inwardly. The shouldered side edges of each plate joins with plates on either side, the upwardly facing shoulder of one overlapping or interfitting with the outwardly facing shoulder of the next and so on, entirely around one circular row or course of plates or liners as shown in Figure 1. Each circular row of liners may not, however, register with those of the next, but may be preferably staggered so that the longitudinal joints between the liners of one circular course fall between the joints of the courses on either side, as in Figure 2.

And, finally, each liner has one or more holes 4 cored through it along the longitudinal center line. As shown (Figure 3, there are two of such holes provided, one being spaced inwardly from each end about one-fourth the length of the liner. On the inner face of the liner these holes are counter-sunk.

These liners are moulded or cast of clay and then fired in the same manner that pipe and other vitrified products are made, so that their exterior surfaces present the same hard glazed finish common to such products.

The preferred method of constructing a pipe line, incorporating the liners, will be understood from the following: Two cylindric forms A and B of suitable length would be used, one for the inside and the other for the outside, with the space between to be filled with concrete after the inner lining has been constructed around the inner form A. This would be done by erecting the inner form and then building up the lining around the form liner by liner. As the liners are put in place, however, lugs or pins 5 are inserted through the holes 4 from the inside of the liners. These lugs have the shape of pins or bolts with a flat conical head at one end of a round shank, and are preferably made of some non-corrosive metal such as "Monel metal" (a nickel alloy) or other suitable material. The holes in the liners are sized to receive the lugs with a snug fit, the heads seating flush in the counter-sunk recesses on the inner faces of the liners and the shank extending through and beyond the outer surfaces thereof, to be eventually embedded in the concrete outer shell or layer.

Consequently, the length of the lugs is governed by the distance they should extend into the concrete to provide a firm anchorage, and, if desired, notches 5a may be formed along the shank, as shown in Figure 4, to increase the holding capacity of these lugs. Other modifications in the lugs will be later noted.

Having erected the lining about the inner form with the lugs in place, the entire outer surface of the lining 2 is then coated or sprayed with a sealing compound, such as asphaltum, tar or other suitable substance which is not effected by the destructive acid gases in the sewage. This coating serves not only to fill in and seal the joints and crevices between liners and between the lugs and the holes, but provides an intermediate protective layer 6 between the inner lining and the outer body of concrete.

The lining having thus been erected and sealed, the outer form B is then placed around the inner form and the concrete poured in the usual manner and allowed to set and harden. The forms, which would be of sectional design, are then removed and the same operation repeated for the next section of the pipe.

The pipe so constructed would thus have an inner lining of vitrified clay, an intermediate layer of sealing compound, and an outer shell or layer of concrete in which are firmly embedded the ends of the lugs which anchor the lining to the concrete structure of the pipe.

One of the chief advantages of this method of construction is the use of the separate lugs inserted through cored holes in the liners, as compared for instance, with ribs, beads, grooves or other anchoring devices cast on the outer face of the liners for the purpose of affording an anchorage in the concrete. In the manufacture of the liners, the ease of drawing them from the moulds determines the shape and arrangement of these integral anchoring devices. As a result, an anchoring projection which is suitable from a manufacturing standpoint is not generally practical in the construction of the sewer pipe, on account of the difficulty in obtaining a perfect anchorage in the concrete, due to the fact that in pouring the concrete it does not fill in completely around the projections, but leaves pockets or voids which weakens the pipe structure, this being particularly true where the projections extend longitudinally of the liners. With the use of the separate lugs, however, it is only necessary to core holes through the plates, thereby materially simplifying the manufacture of the lining material. Again, the lugs may be made of a material more suitable for anchoring purposes than that of the liner itself, such as metal, and their shape is such that the concrete readily flows between and around them so that they become firmly embedded. Moreover, separate anchoring members permits of variation in their length and shape, to meet different operating conditions. For instance, the shanks of the lugs may be lengthened to extend through the concrete shell, with their projecting ends 5b threaded to receive locking members or threaded extensions provided at both ends, as shown in dotted lines (Figure 4), and which can be used for supporting the forms if the contractor desires.

Having set forth a preferred embodiment of my invention,

I claim:

1. A sewer pipe comprising an outer cylindric shell of relatively thick concrete, a thin layer of a non-corrosive sealing compound covering the inner surface of said shell, an inner lining consisting of thin plates of a vitreous substance joined edge to edge, and anchor members consisting of pins of non-corrosive material passing through holes in said plates with their shank portions embedded radially in said outer shell.

2. A sewer pipe comprising an outer cylindric shell of relatively thick concrete, a thin layer of a non-corrosive sealing compound covering the inner surface of said shell, an inner vitreous lining of relatively thin plates adapted to be laid edge to edge and having holes therethrough, and anchoring members consisting of pins of a non-corrosive metal adapted to be inserted through the holes in said plates from the inside of the pipe and their shank portions embedded in said outer shell.

Signed at Webster City, Iowa, this 23rd day of July, 1929.

CLARE H. CURRIE.